United States Patent
Barkai et al.

(10) Patent No.: US 9,857,098 B2
(45) Date of Patent: Jan. 2, 2018

(54) HEAT RECEIVER TUBE, METHOD FOR MANUFACTURING THE HEAT RECEIVER TUBE, PARABOLIC TROUGH COLLECTOR WITH THE RECEIVER TUBE AND USE OF THE PARABOLIC TROUGH COLLECTOR

(75) Inventors: Menashe Barkai, Tel Aviv (IL); Rami Ezer, Ramat Gan (IL); Eli Lipman, Rishon LeZion (IL)

(73) Assignee: SIEMENS CONCENTRATED SOLAR POWER LTD., Beit Shemesh (IL)

( * ) Notice: Subject to any disclaimer, the term of this patent is extended or adjusted under 35 U.S.C. 154(b) by 818 days.

(21) Appl. No.: 13/511,445

(22) PCT Filed: Dec. 1, 2010

(86) PCT No.: PCT/EP2010/068653
§ 371 (c)(1),
(2), (4) Date: Nov. 1, 2012

(87) PCT Pub. No.: WO2011/067294
PCT Pub. Date: Jun. 9, 2011

(65) Prior Publication Data
US 2013/0186389 A1    Jul. 25, 2013

(51) Int. Cl.
*F24J 2/24*    (2006.01)
*F24J 2/12*    (2006.01)
(Continued)

(52) U.S. Cl.
CPC .............. *F24J 2/244* (2013.01); *F24J 2/07* (2013.01); *F24J 2/12* (2013.01); *F24J 2/487* (2013.01);
(Continued)

(58) Field of Classification Search
CPC . Y02E 10/44; Y02E 10/41; F24J 2/244; F24J 2/07; F24J 2/12; F24J 2/487; F24J 2/14
(Continued)

(56) References Cited

U.S. PATENT DOCUMENTS 4,134,391 A * 1/1979 Mandjuri ................. F24J 2/055
126/652
4,160,523 A * 7/1979 Stevens ......................... 126/625
(Continued)

FOREIGN PATENT DOCUMENTS

| CN | 101023305 A | 8/2007 |
|---|---|---|
| WO | WO 2009051595 A1 * | 4/2009 |
| WO | WO 2009061795 A1 | 5/2009 |

*Primary Examiner* — Avinash Savani
*Assistant Examiner* — Rabeeul Zuberi

(57) ABSTRACT

A heat receiver tube for absorbing solar energy and for transferring the absorbed solar energy to a heat transfer fluid is provided. The heat receiver tube includes a first partial surface, which is covered by a solar energy absorptive coating, and a second partial surface, which is substantially uncovered by the absorbing coating. Also provided is a parabolic trough collector with a parabolic mirror having a sunlight reflecting surface for concentrating sunlight in a focal line of the parabolic mirror and a heat receiver tube which is arranged in the focal line of the parabolic mirror, wherein the heat receiver tube is arranged in the focal line such that the first partial surface with the solar absorptive coating is at least partially located opposite to the sunlight reflecting surface and the second partial surface at least partially averted to the sunlight reflecting surface.

11 Claims, 1 Drawing Sheet

(51) Int. Cl.
*F24J 2/07* (2006.01)
*F24J 2/48* (2006.01)
*F24J 2/14* (2006.01)

(52) U.S. Cl.
CPC ............... *F24J 2/14* (2013.01); *Y02E 10/41* (2013.01); *Y02E 10/44* (2013.01)

(58) Field of Classification Search
USPC ............... 126/676, 692, 651, 653, 657, 901
See application file for complete search history.

(56) References Cited

U.S. PATENT DOCUMENTS

| | | | |
|---|---|---|---|
| 4,166,880 A | 9/1979 | Loferski | |
| 4,233,957 A * | 11/1980 | Kenny | F24J 2/055 126/652 |
| 4,285,330 A * | 8/1981 | Shook | F24J 2/14 126/573 |
| 4,312,915 A * | 1/1982 | Fan | F24J 2/487 126/569 |
| 4,582,111 A * | 4/1986 | Kuehn et al. | 164/46 |
| 4,826,525 A * | 5/1989 | Chesworth | C03B 23/023 65/104 |
| 5,039,561 A | 8/1991 | Debe | |
| 5,336,558 A | 8/1994 | Debe | |
| 5,465,708 A * | 11/1995 | Goebel | F03G 6/06 126/635 |
| 2005/0109387 A1* | 5/2005 | Marshall | 136/253 |
| 2007/0157923 A1* | 7/2007 | Le Lievre | F24J 2/07 126/692 |
| 2007/0209658 A1* | 9/2007 | Riffelmann et al. | 126/684 |
| 2008/0000521 A1* | 1/2008 | Sivoththaman et al. | 136/254 |
| 2008/0073321 A1* | 3/2008 | Hyland et al. | 216/41 |
| 2009/0288657 A1* | 11/2009 | Nishihara | 126/634 |

* cited by examiner

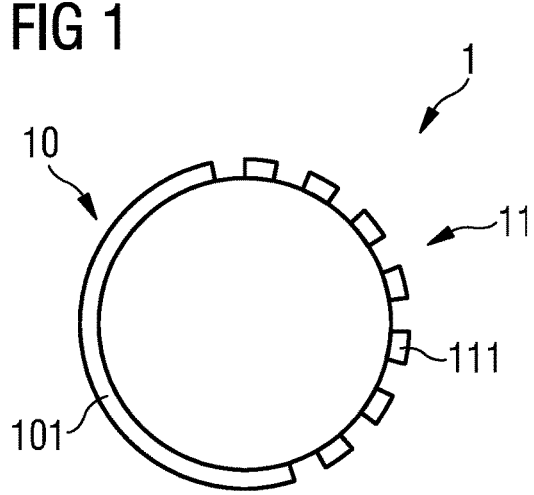
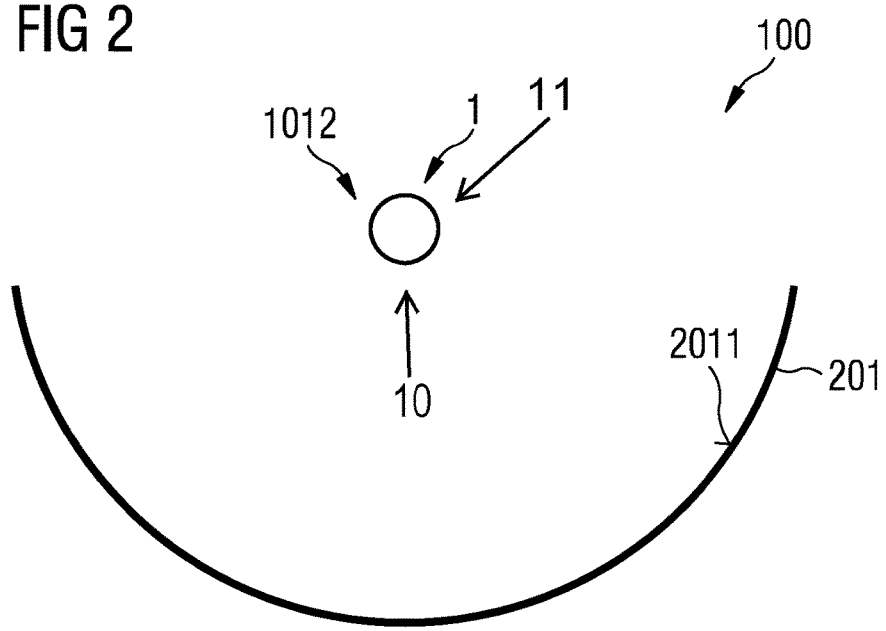

HEAT RECEIVER TUBE, METHOD FOR MANUFACTURING THE HEAT RECEIVER TUBE, PARABOLIC TROUGH COLLECTOR WITH THE RECEIVER TUBE AND USE OF THE PARABOLIC TROUGH COLLECTOR

CROSS REFERENCE TO RELATED APPLICATIONS

This application is the US National Stage of International Application No. PCT/EP2010/068653 filed Dec. 1, 2010, and claims the benefit thereof. The International Application claims the benefits of U.S. Provisional Application No. 61/265,494 US filed Dec. 1, 2009. All of the applications are incorporated by reference herein in their entirety.

BACKGROUND OF THE INVENTION

1. Field of the Invention

This invention relates to a heat receiver tube and a method for manufacturing the heat receiver tube. Moreover a parabolic trough collector and a use of the parabolic trough collector are provided.

2. Description of the Related Art

A sun energy collecting unit of a sun field power plant based on the concentrated solar power technique is for instance a parabolic trough collector with parabolic mirrors and a heat receiver tube. The heat receiver tube is arranged in a focal line of the mirrors. By sunlight reflecting surfaces of the mirrors the sunlight is focused to the heat receiver tube, which is filled with a heat transfer fluid, e.g. a thermo-oil. Via the heat receiver tube the energy of the sunlight is coupled into the heat transfer fluid. Solar energy is converted to thermal energy.

In order to maximize an efficiency, with which the energy of the sunlight is coupled into the heat transfer fluid, a solar energy absorptive coating is attached on a surface of the heat receiver tube. Such an absorptive coating commonly comprises a multilayer stack with sequentially deposited thin film layers having different optical characteristics.

An essential overall optical characteristic of the absorptive coating is a high solar absorbance (low solar reflectivity) for wavelengths of solar spectrum (absorption radiation). Additionally a low emissivity (high reflectivity) for infrared radiation is advantageous. Such a coating is called selective solar coating.

For the manufacturing of the heat receiver tube the solar absorptive coating is attached on the surface of the heat receiver tube by a sequential profile of thin films deposition on the surface using a method like sputtering.

SUMMARY OF THE INVENTION

It is an object of the invention to provide a heat receiver tube with an energy yield which is improved in comparison to the state of the art.

It is another object of the invention to provide a parabolic trough collector with the heat receiver tube.

A further object of the invention is to provide a use of the parabolic trough collector.

These objects are achieved by the inventions specified in the claims.

A heat receiver tube for absorbing solar energy and for transferring the absorbed solar energy to a heat transfer fluid which can be located inside the heat receiver tube is provided. The heat receiver tube comprises at least one first partial surface, which is covered by a solar energy absorptive coating for absorbing an absorption radiation of a certain spectrum of the sunlight, and at least one second partial surface, which is substantially uncovered by the absorbing coating. The first partial surface and the second partial surface are segments of the lateral area of the heat receiving tube. For instance, the first partial surface is formed by a segment with circumference (segment angle) between 90° and 270° whereas the second segment is formed by a segment with a circumference between 180° and 90°.

Additionally a method for manufacturing a heat receiver tube according is disclosed. The method comprises following steps: a) Providing an uncovered heat receiver tube with the first partial surface and the second partial surface; and b) Attaching a solar energy absorptive coating on the first partial surface of the heat receiver tube whereby the second partial surface remains substantially uncovered.

Also provided is a parabolic trough collector comprising at least one parabolic mirror having a sunlight reflecting surface for concentrating sunlight in a focal line of the parabolic mirror and at least one heat receiver tube which is arranged in the focal line of the parabolic mirror, wherein the heat receiver tube is arranged in the focal line such that the first partial surface with the solar absorptive coating is at least partially located opposite to the sunlight reflecting surface and the second partial surface at least partially averted to the sunlight reflecting surface. The first partial surface with the solar absorptive coating and the sunlight reflecting surface of the mirror are arranged face to face.

Finally a use of the parabolic trough collector in a power plant for converting solar energy into electrical energy is disclosed.

The concept of the invention is to cover just a first partial surface of the heat receiver tube with a solar energy absorptive coating. The heat receiver tube is arranged in the focal line of the parabolic mirror such that concentrated solar radiation impinges the solar absorptive coating. The part of the heat receiver tube which is not heated by concentrated solar radiation (i.e. that part which typically faces the sun and is thus subject only to direct solar radiation) is not coated at all or is coated by a non-selective coating.

Preferably the first partial surface and/or the second partial surface are aligned along a longitudinal alignment of the heat receiver tube.

In a preferred embodiment the first partial surface comprises a first segment of a lateral area of the heat receiver tube with a circumference which is selected from the range between 150° and 300° and preferably between 180° and 270°. In a further preferred embodiment the second partial surface comprises a second segment of the lateral area of the heat receiver tube with a circumference which is selected from the range between 210° and 60° and preferably between 180° and 90°. These angles are optimized concerning the thermal characteristics of the heat receiver tube.

Preferably at least one of the partial surfaces forms a contiguous area. The heat receiver tube is arranged in the focal line in parallel to the longitudinal alignment of the mirror. By this the absorption of solar energy is very efficiently. Concentrated solar radiation impinges always the solar absorptive coating (intensity about 52 suns) whereas the second partial surface in not impinged by the concentrated solar radiation (intensitiy about 0.6 suns). Very small amount of energy could be waste while gaining much more in heat losses due to overall emissivity.

The second partial surface can be covered or can be uncovered. Advantageous is a low emissivity of the second partial surface.

Preferably the second partial surface comprises an emissivity for infrared radiation, at temperature higher than 350° C. which is less than 20%. In a preferred embodiment the second partial surface comprises a metal which is selected from the group existing of Aluminum, Copper, Silver, Gold and Molybdenum. Other metals or alloys are possible, too. For instance, the second partial surface of the heat receiver tube is covered by a layer with Copper. Such a coating with Copper blocks a heat radiation (emissivity) on the upper part of the heat receiver tube which is impinged upon by direct solar radiation. This strongly reduces the overall receiver heat losses while losing some of the total radiation impinging thereupon. The overall ratio of absorption to emissivity of the heat receiver tube is therefore increased even if some of the direct sun radiation is lost. The areas of the first partial surface and the second partial surface don't have to have the same extent. The extents of the partial surfaces are easily are optimized as well as their location on the lateral surface of the heat receiver tube (e.g. due to RIM).

For the attaching the solar absorptive coating on the first partial surface of the heat receiver tube a thin film deposition technique is used. The thin film deposition technique is selected from the group consisting of atomic layer deposition, chemical vapor deposition and physical vapor deposition. The physical vapor deposition is for instance sputtering.

In order to get a selectively coated surface of the attaching of the solar absorptive coating is carried out with the aid of a mask method. Other suitable methods are possible, too.

Following advantages are connected to the invention:

A wider range of available materials is accessible for the second partial surface of the heat receiver tube. For instance such material cannot be used for the selective coating.

Higher blockage of heat radiation at the non-selective coated part results due to better fitted materials.

This results in an overall higher ratio of absorption to emissivity of the complete heat receiver tube.

The invention is a solution for working with heat transfer fluids inside the heat receiver tube, for instance steam, where heat transfer characteristics of the fluid causes bowing of the heat receiver tube, since the upper part of the receiver undergoes thermal expansion at a lower rate than the lower part of the heat receiver tube. The low emissivity of the non selective coating mitigates this by keeping the temperature of the upper part of the heat receiver tube at an elevated temperature due to less emission of this part. Selective absorption coating all around the heat receiver tube, even if dynamically controlled to have different layer thicknesses or absorption spectra at the two sides, is limited in its capability to overcome this issue.

BRIEF DESCRIPTION OF THE DRAWINGS

Further features and advantages of the invention are produced from the description of exemplary embodiments with reference to the drawing. The drawings are schematic.

FIG. 1 shows a cross section of heat receiver tube.

FIG. 2 shows a cross section of a parabolic trough collector.

DETAILED DESCRIPTION OF THE INVENTION

Given is heat receiver tube 1 with a first partial surface 10 and a second partial surface 11 (FIG. 1). The first partial surface is covered by a solar energy absorptive coating (selectively absorptive coating) 101. The solar energy absorptive coating is a multilayer arrangement with different layer with different optical characteristics.

The second partial surface is covered by a non selective coating 111 (doted). This coating comprises copper for example.

The heat receiver tube is part of a parabolic trough collector 100. The parabolic trough collector comprises at least one parabolic mirror 201 with a sunlight reflective surface 2011. By the reflective surface sunlight is concentrated in the focal line 1012 of the parabolic mirror 201.

The heat receiver tube 1 is located in the focal line of the parabolic mirror 201. Thereby the first partial surface 10 of the heat receiver tube 1 (lower part of the receiver tube) is opposite to the sunlight reflective surface 2011 of the mirror 201. The second partial surface 11 (upper part of the heat receiver tube 1) is averted to the sunlight reflective surface 2011 of the mirror 201 and is impinged upon by direct solar radiation.

Inside the heat receiver tube a heat transfer fluid is located. By the solar energy absorptive coating sunlight is absorbed and transferred into heat. This heat is transferred to the heat transfer fluid.

The parabolic trough collector is used in a solar power plant for converting solar energy into electrical energy.

The invention claimed is:

1. Heat receiver tube for absorbing solar energy and for transferring the absorbed solar energy to a heat transfer fluid located inside the heat receiver tube, wherein the heat receiver tube comprises:
a first partial surface, which is covered by a selective solar energy absorptive coating for absorbing an absorption radiation of a certain spectrum of the sunlight, and
a second partial surface, which is uncovered by the absorptive coating impinged upon by direct solar radiation,
wherein the second partial surface is covered by a non-selective layer comprising copper,
wherein the second partial surface comprises an emissivity for infrared radiation which is less than 20%,
wherein the first partial surface comprises a first continuous segment of a lateral area of the heat receiver tube with a first circumference which is selected from a first range between 150° and 300°, and
wherein the second partial surface comprises a second continuous segment of the lateral area of the heat receiver tube with a second circumference which is selected from a second range between 210° and 60°,
wherein the first range and the second range equal 360°.

2. The heat receiver tube according to claim 1, wherein the first partial surface and the second partial surface are aligned along a longitudinal alignment of the heat receiver tube.

3. The heat receiver tube according to claim 1, wherein the first circumference is selected from the range between 180° and 270°.

4. The heat receiver tube according to claim 1, wherein the second circumference is selected from the range between 180° and 90°.

5. Method for manufacturing a heat receiver tube, comprising:
providing an uncovered heat receiver tube with a first partial surface and a second partial surface; and
attaching a selective solar energy absorptive coating to the first partial surface of the heat receiver tube, wherein the second partial surface remains substantially uncovered by the solar energy absorptive coating, covering the second partial surface by a non-selective layer comprising copper, wherein the second partial surface including the layer comprises an emissivity for infrared radiation which is less than 20%, wherein the first partial surface comprises a first continuous segment of a lateral area of the heat receiver tube with a first circumference which is selected from a first range between 150° and 300°, wherein the second partial surface comprises a second continuous segment of the lateral area of the heat receiver tube with a second circumference which is selected from a second range between 210° and 60°, and wherein the first range and the second range equal 360°.

6. The method according to claim 5, wherein a thin film deposition technique is used for attaching the solar energy absorptive coating to the first partial surface of the heat receiver tube.

7. The method according to claim 6, wherein the thin film deposition technique is selected from the group consisting of atomic layer deposition, chemical vapor deposition, physical vapor deposition, and a combination thereof.

8. The method according to claim 5, wherein the attaching is carried out with the aid of a mask method.

9. Parabolic trough collector, comprising:

a parabolic mirror having a sunlight reflecting surface for concentrating sunlight in a focal line of the parabolic mirror; and a heat receiver tube according to claim 1 which is arranged in the focal line of the parabolic mirror;

wherein the heat receiver tube is arranged in the focal line such that the first partial surface with the solar absorptive coating is at least partially located opposite to the sunlight reflecting surface and the second partial surface is at least partially averted to the sunlight reflecting surface.

10. The method according to claim 5, wherein the second partial surface comprises an emissivity for infrared radiation which is less than 20%.

11. The heat receiver tube according to claim 1, wherein the first partial surface or the second partial surface are aligned along a longitudinal alignment of the heat receiver tube.

\* \* \* \* \*